United States Patent [19]

Broton

[11] 4,380,822
[45] Apr. 19, 1983

[54] TRANSMIT-RECEIVE SWITCHING CIRCUIT FOR RADIO FREQUENCY CIRCULATORS

[75] Inventor: Robert M. Broton, Palatine, Ill.

[73] Assignee: Motorola, Inc., Schaumburg, Ill.

[21] Appl. No.: 317,707

[22] Filed: Nov. 2, 1981

[51] Int. Cl.³ .............................................. H04B 1/48
[52] U.S. Cl. ....................................... 455/80; 455/82; 455/83; 333/17 M
[58] Field of Search ....................... 455/79, 80, 82, 83, 455/129; 333/17 M, 32; 343/852, 861

[56] References Cited

U.S. PATENT DOCUMENTS

| | | | |
|---|---|---|---|
| 2,914,671 | 11/1959 | De Lange | 333/103 |
| 3,019,431 | 1/1962 | De Poy et al. | 333/103 |
| 3,205,493 | 9/1965 | Cohen | 343/876 |
| 3,309,698 | 3/1967 | Baldock | 455/83 |
| 4,028,645 | 6/1977 | Tressa | 455/80 |
| 4,055,807 | 10/1977 | Priniski et al. | 455/83 |

Primary Examiner—Jin F. Ng
Attorney, Agent, or Firm—Mark P. Kahler; Edward M. Roney; James W. Gillman

[57] ABSTRACT

A transmit-receive switching circuit is provided for switching a transmitter and a receiver to common antenna via a common signal path. A circulator is employed in the common signal path. The flow of transmitter RF energy and received RF energy is controlled through the circulator by a selectively actuable impedance element coupled to the circulator.

2 Claims, 3 Drawing Figures

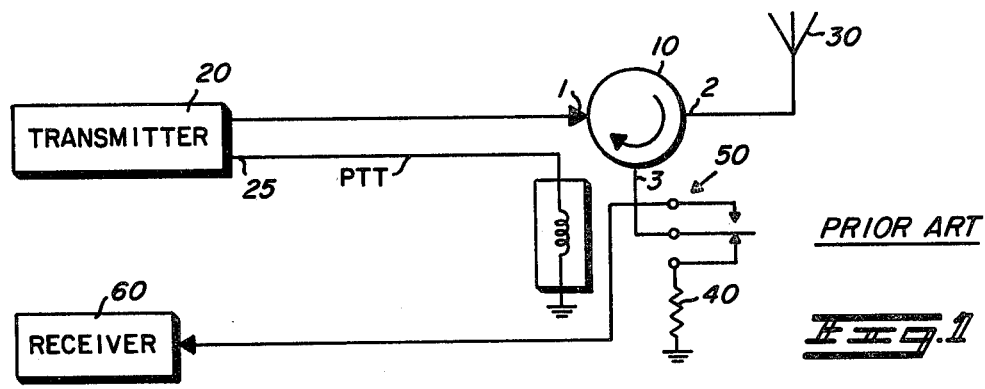
_Fig. 1_ PRIOR ART
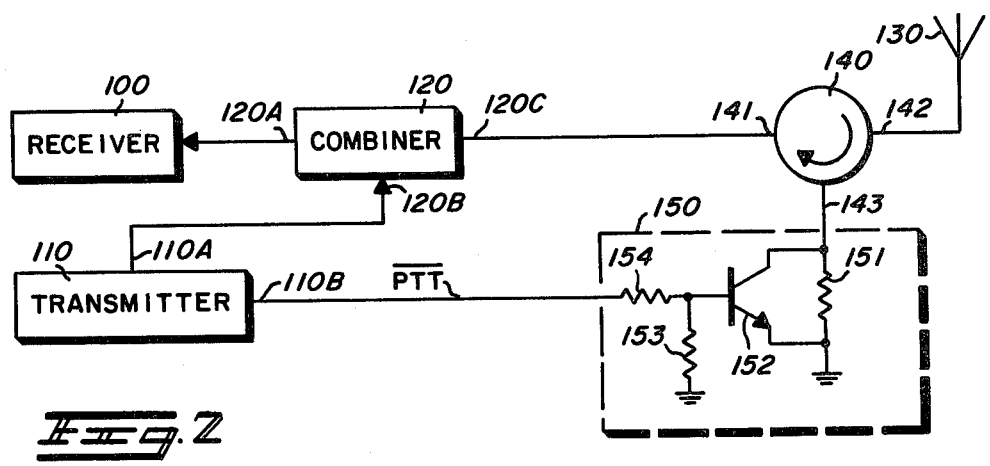
_Fig. 2_
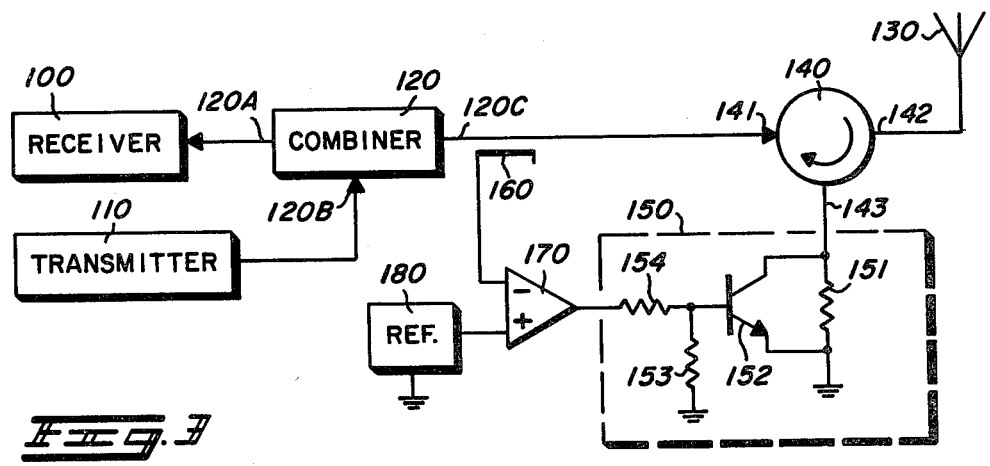
_Fig. 3_

TRANSMIT-RECEIVE SWITCHING CIRCUIT FOR RADIO FREQUENCY CIRCULATORS

BACKGROUND OF THE INVENTION

This invention relates to transmit-receive switching circuits and, more particularly to transmit-receive switching circuits employed in conjunction with radio frequency circulators.

DESCRIPTION OF THE PRIOR ART

A conventional transmit-receive circuit employing a radio frequency circulator 10 is shown in FIG. 1. Circulator 10 includes three ports, namely port 1, port 2 and port 3 at which radio frequency energy is injected into or removed from circulator 10. The magnetic field within circulator 10 is caused to flow in such a manner that radio frequency energy flows clockwise around ports 1, 2 and 3 as indicated by the curved arrow on circulator 10 in FIG. 1.

The transmit-receive circuit of FIG. 1 is shown in transmit mode. More specifically, a transmitter 20 is coupled to port 1 of circulator 10 to provide radio frequency (RF) energy thereto. Such RF energy flows through circulator 10 to port 2 which is electrically coupled to antenna 30 such that transmission is achieved. If antenna 30 is perfectly matched, that is, matched to the particular characteristic impedance selected for circulator 10, for example 50 ohms, then no RF energy is reflected back from antenna 30 to port 2. However, if antenna 30 exhibits an impedance mismatch, the reflected power caused by such mismatch travels from antenna 30 to port 2. Due to the action of circulator 10, such reflected RF energy at port 2 does not reach port 1 and travel back to transmitter 20. Rather, the action of circulator 10 causes the reflected RF energy appearing at port 2 to travel to port 3 where it is safely dissipated by a load resistor 40 coupled to port 3 via an energized relay switch 50. Relay 50 is coupled to a push to talk output 25 of transmitter 20 which energizes relay 50 whenever transmitter 20 transmits. Thus, load resistor 40 is coupled to port 3 whenever transmission occurs. From the above, it is seen that transmitter 20 is desirably isolated from RF energy which may be reflected from antenna 30 in transmit mode.

In receive mode, relay 50 is de-energized such that port 3 is electrically coupled to a receiver 60. Thus, RF energy received at antenna 30 travels to port 2 through circulator 10 to port 3 and then via de-energized relay 50 to receiver 60. It is seen that the above described transmit-receive switching circuit employs a mechanical relay to, in essence, achieve switching between two distinct signal paths, for transmitted and received RF energy, respectively. Such mechanical switching circuits are unfortunately prone to failure after a finite number of switching operations. Further, such mechanical switching circuits have an associated high cost.

It is one object of the present invention to provide a transmit-receive switching circuit employed in conjunction with an RF circulator which eliminates mechanical switching between two distinct signal paths and the attendant deficiencies in such circuits.

Another object of the present invention is to provide a transmit-receive switching circuit wherein transmitter and receiver RF energy are combined into a common signal path while eliminating any mechanical switching structures.

These and other objects of the invention will become apparent to those skilled in the art upon consideration of the following description of the invention.

BRIEF SUMMARY OF THE INVENTION

The present invention is directed to providing a transmit-receive switching circuit for electrically coupling a receiver and transmitter to a common antenna.

In accordance with one embodiment of the invention, the switching circuit includes a combining circuit which is electrically coupled to the receiver and the transmitter. The combining circuit provides signals from the transmitter to a common signal path and provides signals from the common path to the receiver in a manner maintaining isolation between the receiver and transmitter. The switching circuit includes a circulator exhibiting a predetermined characteristic impedance and having first, second and third ports. The first and second ports are electrically coupled to the common signal path and the common antenna, respectively. A selectively actuable impedance is electrically coupled to the third port. This selectively actuable impedance exhibits an impedance approximately equal to the characteristic impedance of the circulator when the transmitter is transmitting and exhibits an impedance substantially less than such characteristic impedance when the transmitter ceases transmitting.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DESCRIPTION OF THE DRAWINGS

FIG. 1 is a representation of a prior art transmit-receive switching circuit employing a mechanical relay to achieve mode switching.

FIG. 2 is a block diagram of one embodiment of the transmit-receive switching circuit of the present invention.

FIG. 3 is a block diagram of another embodiment of the transmit-receive switching circuit of the present invention.

DETAILED DESCRIPTION OF THE PREFERRED EMBODIMENT

FIG. 2 illustrates one embodiment of the transmit-receive switching circuit of the present invention. The switching circuit of FIG. 2 includes a radio frequency receiver 100 for receiving signals of selected frequency and further includes a transmitter 110 for transmitting signals exhibiting a selected frequency. The input of receiver 100 and the output 110A of transmitter 110 are electrically coupled to output 120A and input 120B, respectively, of a combiner circuit 120. Combiner circuit 120 includes an input-output terminal 120C electrically coupled to an antenna 130 via a circulator 140 in a manner subsequently described in detail. Combiner circuit 120 permits transmitter energy to flow from the output 110A of transmitter 110 through combiner input 120B to combiner terminal 120C while isolating such energy from combiner input 120A and receiver 100 coupled thereto. Conversely, combiner circuit 120 permits radio frequency energy to flow from input-output terminal 120C to output 120A and receiver 100 coupled thereto when transmitter 110 is not transmitting. A degree of radio frequency isolation is thus achieved between receiver 100 and transmitter 110. One combiner circuit which may be employed as combiner circuit 120 is described and claimed in U.S. Pat. No. 4,055,807 for an Antenna Switch, issued Oct. 25, 1977 and assigned to the instant assignee.

Circulator 140 includes three ports, namely port 141, port 142, and port 143. The input-output terminal 120C of combiner 120 is electrically coupled to port 141 thus providing a common path for radio frequency energy to travel from combiner 120 to port 141 and vise versa. Circulator port 142 is coupled to an antenna 130. Circulator port 143 is coupled to a selectively actuable impedance circuit 150 which exhibits an impedance approximately equal to the characteristic impedance of circulator 140 (for example, 50 ohms in one embodiment) when transmitter 110 is transmitting. In such transmit mode, impedance circuit 150 is instructed to exhibit the aforementioned characteristic impedance by a push-to-talk (PTT) type logic signal received from transmitter 110 output 110B electrically coupled thereto as shown in FIG. 2. In the transmit mode, radio frequency energy flows from the output 110A of transmitter 110 to the input 120B of combiner 120 where such transmitter energy is provided to input-output terminal 120C. Such transmitter RF energy at terminal 120C flows to port 141 through circulator 140 to port 142 and thereafter to antenna 130 at which RF energy is radiated. If antenna 130 is perfectly matched to the characteristic impedance of circulator 140, then no reflected energy is present at port 142. However, if some mismatch should occur at antenna 130, the reflected RF energy appearing at port 142 travels thru circulator 140 to port 143 at which it is safely dissipated in impedance circuit 150.

In receive mode, transmitter 110 ceases transmission and generates an appropriate logic signal at push-to-talk (PTT) output 110B to cause impedance circuit 150 to exhibit an impedance substantially lower than the characteristic impedance of circulator 140, for example, an impedance sufficiently low to effectively short circulator port 143 to ground. This mismatch or short (impedance substantially equal to zero) at port 143 causes received RF energy from antenna 130 which appears at port 142 to bypass port 143 and travel onward to port 141. From port 141 such received RF energy travels through combiner circuit 120 to the input of receiver 100. It is thus seen that a common signal path exists between combiner input-output terminal 120C and circulator input 141 along which both transmitter RF energy and received RF energy travel at different times.

One selectively actuable impedance circuit which may be employed as impedance circuit 150 is shown in FIG. 2 within block 150. Impedance circuit 150 includes a load resistor 151 approximately exhibiting the characteristic impedance of circulator 140, for example 50 ohms. One terminal of resistor 151 is coupled to circulator port 143 and the remaining terminal of resistor 151 is coupled to ground. A switching transistor 152, for example a low power NPN transistor, includes a collector which is electrically coupled to the terminal of resistor 151 coupled to circulator port 143. The emitter of transistor 152 is coupled to the remaining terminal of resistor 151. The base of transistor 152 is coupled to a biasing circuit including resistors 153 and 154. Resistor 153 is coupled from the base of transistor 152 to ground. Resistor 154 is coupled from the base of transistor 152 to the push-to-talk (PTT) output 110B of transmitter 110. It is thus seen that when the switching circuit of FIG. 2 is in transmit mode, an appropriate logic signal is provided from transmitter PTT output 110B to impedance circuit 150. Such logic signal causes transistor 152 to remain in a turned off state such that transistor 152 presents a high impedance in parallel with load resistor 151 which is situated at circulator port 143 to ground. Thus, the load presented to the circulator at port 143 is approximately equal to the characteristic impedance of circulator 140. In this state, RF energy from transmitter 110 travels through the switching circuit of FIG. 2 to antenna 130 in the manner already described in detail. However, when transmitter 110 ceases transmission and the receive mode commences, an appropriate logic signal is generated at transmitter PTT output 110B which causes transistor 152 to turn on and effectively short out resistor 151. Thus, a short to ground appears at circulator port 143. Therefore, received RF energy from antenna 130 passes through circulator 140 by bypassing mismatched port 143 and traveling onward to receiver 100 in the manner already described in detail.

FIG. 3 shows another embodiment of the transmit-receive switching circuit of the present invention which is substantially the same as the circuit of FIG. 2 except for the following modifications. Like numbers between FIG. 2 and FIG. 3 indicate like components. A radio frequency coupler 160, of the type well known to those skilled in the art, is coupled to the common path between combiner input-output terminal 120C and circulator port 141. Coupler 160 is electrically coupled to the inverting input of a comparator 170. The non-inverting input of comparator 170 is coupled to a reference voltage source 180, which may be of the variable type, as shown in FIG. 3. The output of comparator 170 is coupled to the input of selectively actuable impedance circuit 150. It is seen that coupler 160, comparator 170 and reference voltage source 180 cooperate to form an RF power detecting circuit. More specifically, when the switching circuit of FIG. 3 is in transmit mode, transmitter 110 generates RF energy which appears at the common path between combiner input-output terminal 120C and circulator port 141. A portion of this RF energy is sensed by coupler 160 and provided to comparator 170. The threshold voltage of the voltage reference source 180 is selected to be sufficiently low such that the transmitter energy provided to comparator 170 causes an appropriate logic voltage to be generated at the output of comparator 170 to cause impedance circuit 150 to exhibit the aforementioned characteristic impedance. However, when transmission by transmitter 110 ceases, the voltage provided to the inverting terminal of comparator 170 via coupler 60 no longer exceeds the threshold voltage of source 180. The receive mode is thus commenced and comparator 170 generates an appropriate logic voltage at its output which causes switching circuit 150 to exhibit an impedance substantially lower than the characteristic impedance of circulator 140 thus essentially mismatching port 143 or shorting port 143 to ground. Received signals thus pass from antenna 130 to receiver 100 in the manner already explained. The embodiment of FIG. 3 eliminates the need for a separate hard wired push-to-talk line (PTT line) and the push-to-talk output terminal 110B at transmitter 110 of FIG. 2. Therefore, circulator 140, antenna 130, impedance circuit 150, coupler 160, comparator 170 and reference 180 may be remotely situated from receiver 100, transmitter 110 and combiner 120.

The foregoing describes a transmit-receive switching circuit which employs a RF circulator in a manner which eliminates mechanically switching between two separate signal paths. The transmit-receive switching circuit permits transmitter and receiver RF energy to flow via a common signal path while retaining mismatch protection in the transmit mode.

While only certain preferred features of the invention have been shown by way of illustration, many modifications and changes will occur to those skilled in the art. It is, therefore, to be understood that the present claims are intended to cover all such modifications and changes as fall within the true spirit of the invention.

What is claimed is:

1. Apparatus for switching a receiver and a transmitter to a common antenna comprising:

combining means, electrically coupled to said receiver and said transmitter, for providing signals from said transmitter to a common signal path and for providing signals from said common path to said receiver in a manner maintaining isolation between said receiver and said transmitter;

a circulator exhibiting a predetermined characteristic impedance and including first, second and third ports, said first and second ports being electrically coupled to said common signal path and said common antenna, respectively, and selectively actuable impedance means, electrically coupled to said third port, for exhibiting an impedance approximately equal to the characteristic impedance of said circulator when said transmitter is transmitting and exhibiting an impedance substantially less than said characteristic impedance when said transmitter ceases transmitting.

2. The apparatus of claim 1, wherein said selectively actuable impedance means comprises an impedance circuit which exhibits an impedance approximately equal to the characteristic impedance of said circulator when said transmitter is transmitting and which exhibits an impedance substantially equal to zero when said transmitter ceases transmission.

* * * * *